United States Patent [19]

Zani

[11] 4,133,914
[45] Jan. 9, 1979

[54] METHOD FOR INSULATING A SOLAR ENERGY COLLECTING DEVICE

[76] Inventor: David A. Zani, P.O. Box 165 Kingshill, St. Croix, V.I. 00850

[21] Appl. No.: 845,447

[22] Filed: Oct. 25, 1977

Related U.S. Application Data

[63] Continuation-in-part of Ser. No. 650,380, Jan. 19, 1976, abandoned.

[51] Int. Cl.² .............................................. B05B 5/00
[52] U.S. Cl. .................................. 427/160; 427/373; 427/379; 427/421; 427/428; 427/429
[58] Field of Search ............... 126/270, 271; 220/9 F; 156/78, 79; 264/54, 46.1, 53; 427/373, 379, 407 R, 160, 428, 429, 421

[56] References Cited

U.S. PATENT DOCUMENTS

| | | | |
|---|---|---|---|
| 3,099,516 | 7/1963 | Henrickson | 264/54 |
| 3,224,894 | 12/1965 | Palmer | 427/373 |
| 3,277,884 | 10/1966 | Rowekamp | 126/271 |
| 3,394,797 | 7/1968 | Flannigan | 264/46.7 |
| 3,468,771 | 9/1969 | Pedlow | 427/373 |
| 3,898,979 | 8/1975 | Medico | 126/271 |
| 3,986,491 | 10/1976 | O'Hanlon | 126/271 |
| 3,989,032 | 11/1976 | Harrison | 126/271 |
| 3,989,562 | 11/1976 | Hladik et al. | 156/79 |
| 4,003,367 | 1/1977 | Wikholm | 126/271 |
| 4,015,582 | 4/1977 | Liu et al. | 126/271 |
| 4,016,323 | 4/1977 | Volovsek | 427/373 |

OTHER PUBLICATIONS

Ferringo, T. H., "Rigid Plastic Foams", Reinhold Publishing Co., Copyright, 1963, pp. 51-62 & 65.

*Primary Examiner*—Michael F. Esposito
*Assistant Examiner*—Sadie L. Childs

[57] ABSTRACT

A solar energy collecting device comprising a collector plate. A wall member is attached to the periphery of the collector plate and to the periphery of a panel to form an enclosure. The central portion of the panel is transparent and transmits solar energy therethrough and into the enclosure. A conduit passing heat transfer fluid during use is disposed within the chamber. The ends of the conduit pass through an aperture in the wall member. The outside of the enclosure is insulated with polyurethane foam that is applied by spraying process. The outside surface of the polyurethane foam is covered with an elastomeric membrane.

4 Claims, 2 Drawing Figures

METHOD FOR INSULATING A SOLAR ENERGY COLLECTING DEVICE

CROSS - REFERENCE TO RELATED APPLICATION

This application is a Continuation-In-Part of my application Ser. No. 650,380 filed Jan. 19, 1976, and now abandoned, and entitled 'Solar Energy Collecting Device and Method For Insulating Same'.

BACKGROUND OF THE INVENTION

The invention relates to a solar energy collecting device and a method of insulating said device.

Insulated solar energy collecting devices are known in the prior art but it is believed that none describes a method for applying insulation that comprises a spraying process, followed by applying an elastomeric membrane to the outside surface of the insulation.

In U.S. Pat. No. 3,866,285 to Clark, a method of manufacturing a solar energy collector is disclosed that requires framing the portion of the collector to be insulated and pouring a plastic mix into the frame to mold the insulation and finally removing the frame after the mix cures.

SUMMARY OF THE INVENTION

It is the principal object of this invention to provide a solar energy collecting device and a method of insulating the device.

It is a further object of this invention to provide a method for insulating the device after it has been mounted for use.

A still further object of this invention is to provide a method of repairing damaged insulation of an existing solar energy collecting device.

A still further object of this invention is to provide an elastomeric membrane to make an air and watertight covering over the insulation.

These and other embodiments are achieved by the preferred embodiment of the present invention comprises the method of spraying a polyurethane foam insulation over a solar energy collector and applying an elastomeric membrane to the outside surface of the insulation.

Having in mind the above and other objects that will be obvious from an understanding of the disclosure, the present invention comprises method which is hereinafter set forth in sufficient detail to enable those persons skilled in the art to clearly understand the function, operation, construction and advantages of it when read in conjunction with the accompanying drawing.

BRIEF DESCRIPTION OF THE DRAWING

The invention will be described in detail, by way of example, with reference to the accompanying drawing in which.

DETAILED DESCRIPTION OF THE INVENTION

Figure 1:
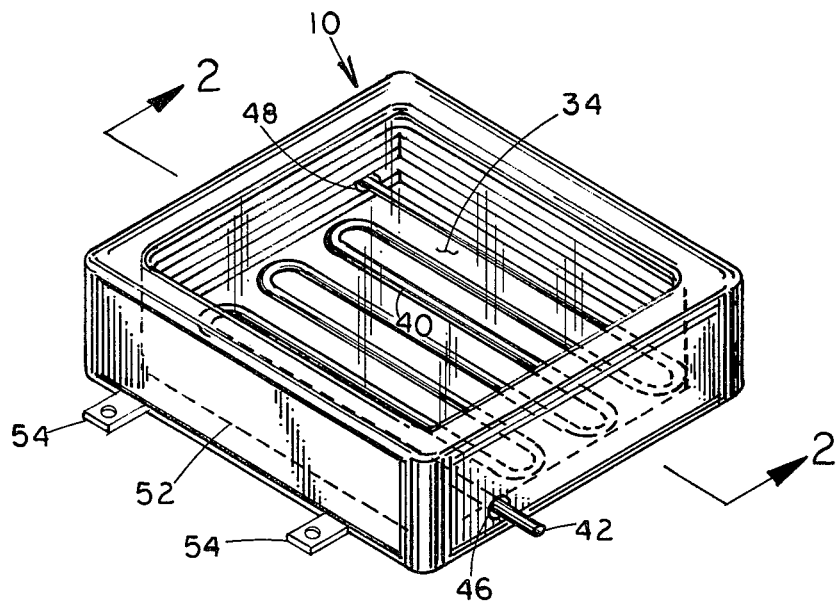
FIG. 1 is a perspective view of the preferred embodiment.
Figure 2:
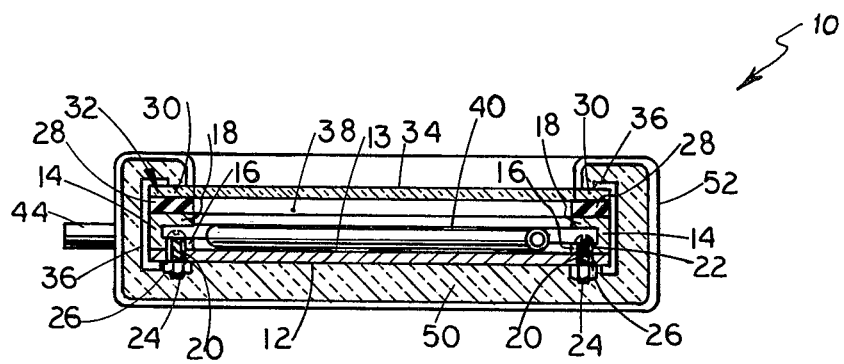
FIG. 2 is a sectional view taken along line 2—2 in FIG. 1.

Referring to FIGS. 1 and 2 of the drawing and in accordance with the principles of this invention, a solar energy collecting device 10 is shown comprising a collector plate 12 having a heat absorbing surface 13 and a wall member 14. The wall member 14 has a pair of spaced apart and inwardly extending flanges; a first or lower flange 16 and a second or upper flange 18 are aligned with the bottom and top of the wall member 14 respectively. The periphery of the collector plate 12 has a plurality of first apertures 20 in line with second apertures 22 in the lower flange 16. Threaded bolts 24 passing through a pair of aligned apertures, 20 and 22 connects the collector plate 12 to the lower flange 16 and secured with nuts 26 in threaded engagement with the bolts 24.

A rubber gasket 28 is interposed between the upper flange 18 and the periphery portion 30 of panel 32. The panel 32 generally comprises glass, clear acrylic plastic or other transparent material capable of transmitting solar energy but only the central portion 34 within the periphery 30 need have this property. A pair of spring clamps 36 maintains the panel 32 against the upper flange 18, the gasket 28 disposed therebetween, to form an enclosure 38.

Although the collector plate 12 is illustrated as a flat plate, many other shapes such as a corrugated section, not shown, may be advantageous for collecting solar energy. These shapes will not preclude the use of the apparatus and method herein disclosed. Similarly, more than one panel may be used to reduce heat loss through this area provided each has a solar energy transmitting central portion.

A conduit 40 is mounted within the enclosure 38 for passing fluid therethrough during use. The conduit 40 has inlet and outlet end portion 42 and 44 that project through the wall member 14 at apertures 46 and 48. Fluid pumped through the conduit 40 will be heated by the transfer of energy that was absorbed by the collector plate surface 13 and the conduit itself by sunlight.

To reduce heat losses and increase the efficiency of the device 10, all outside surfaces of the chamber 13 must be insulated except, of course, for the energy transmitting portion 34 of the panel 32. The insulation 50 is an air-cured polyurethane foam applied by a spraying process. The foam may be formulated by heating a polymeric isocyanate reagent and a polyol resin reagent in separate vessels and the blowing of the heated mixture through the nozzle of a spray gun using a fluorocarbon blowing agent.

To protect the insulation from deterioration by weather or sunlight and to make its surface air and watertight an elastomeric membrane 52 is applied over the insulation.

The elastomeric membrane is selected from the group consisting of silicone rubber, chlorinated synthetic rubber, urethane elastomers, and vinyl acrylics. The elastomeric membrane is applied in fluid form over the polyurethane insulation with a spray gun, roller, or brush to a thickness of 0.004 to 0.4 inches and allowed to air cure to form a seamless elastomeric membrane which will stretch with variations in temperature and is opaque to ultraviolet radiation.

More than one elastomeric membrane may be applied over the insulation. A first elastomeric membrane of urethane elastomer may be applied over the insulation and a second elastomeric membrane of silicone rubber, chlorinated synthetic rubber, or vinyl acrylic applied over the urethane elastomer.

Alternatively the first elastomeric membrane may be one type of urethane elastomer and a second and/or a third elastomeric membrane may be another type of urethane elastomer.

The insulation 50 may be applied over mounted devices 10 since no molds or frames are required to confine the foam as would be the case if a plastic mix were used. Thusly, this method may be used to insulate solar collectors mounted in roofs of buildings where pouring a plastic mix would be impractical. The method may also be used to repair damaged insulation.

Mounting brackets 54, attached to the collector plate 12 are used for installing the device 10.

While preferred methods and other exemplary embodiments of the invention are illustrated and/or described, it will be understood that the invention is in no way limited to these embodiments.

What is claimed is:

1. A method for insulating a solar energy collecting device having a conduit for passing a heat transfer fluid therethrough during use, said conduit disposed between a collector plate and a transparent panel and having side walls interposed therebetween to define a chamber having one transparent surface portion for transmitting solar energy therethrough, the method comprising the steps of:

spraying a polyurethane foam mixture around the outside of the chamber excluding the solar energy transmitting surface portion; and air curing the foam to form a rigid and lightweight insulating coating and a rigid structure to enclose the transparent panel, wall member and collector plate; and applying an elastomeric membrane to the outside surface of the polyurethane insulation and air curing the elastomeric membrane.

2. The method according to claim 1 wherein said elastomeric membrane is applied in fluid form over the polyurethane insulation with a spray gun, roller, or brush to a thickness of 0.004 to 0.4 inches and allowed to air cure to form a seamless elastomeric membrane which will stretch with variations in temperature and is opaque to ultraviolet radiation.

3. The method according to claim 1 wherein said elastomeric membrane is selected from the group consisting of silicone rubber, chlorinated synthetic rubber, urethane elastomers, and vinyl acrylics.

4. The method according to claim 3 wherein a first elastomeric membrane of a urethane elastomer is applied over the polyurethane insulation and a second elastomeric membrane of silicone rubber, chlorinated synthetic rubber, or vinyl acrylic is applied over the urethane elastomer.

* * * * *